US011586158B1

(12) United States Patent
Downing et al.

(10) Patent No.: US 11,586,158 B1
(45) Date of Patent: Feb. 21, 2023

(54) WIRELESS SENSOR SYSTEM AND RELATED METHODS

(71) Applicant: Etellimetrix LLC, Phoenix, AZ (US)

(72) Inventors: Brian D. Downing, San Diego, CA (US); Pranam Joshi, Phoenix, AZ (US); Ramesh Narasimhan, Phoenix, AZ (US); Afreen Shaikh, Phoenix, AZ (US)

(73) Assignee: Etellimetrix, LLC, Phoenix, AZ (US)

( * ) Notice: Subject to any disclaimer, the term of this patent is extended or adjusted under 35 U.S.C. 154(b) by 43 days.

(21) Appl. No.: 16/809,965

(22) Filed: Mar. 5, 2020

Related U.S. Application Data

(60) Provisional application No. 62/814,189, filed on Mar. 5, 2019.

(51) Int. Cl.
*G05B 9/05* (2006.01)
*G05B 23/00* (2006.01)
*G01D 21/02* (2006.01)

(52) U.S. Cl.
CPC ............ *G05B 9/05* (2013.01); *G01D 21/02* (2013.01); *G05B 23/00* (2013.01)

(58) Field of Classification Search
CPC .......... G05B 9/05; G05B 23/00; G01D 21/02
See application file for complete search history.

(56) References Cited

U.S. PATENT DOCUMENTS

| | | | |
|---|---|---|---|
| 7,581,434 B1 | 9/2009 | Discenzo et al. | |
| 8,615,374 B1 | 12/2013 | Discenzo | |
| 9,460,612 B2 | 10/2016 | Vardi | |
| 9,664,814 B2 | 5/2017 | Huizenga et al. | |
| 9,857,803 B1* | 1/2018 | Abuda | G05D 7/0676 |
| | | | 137/487 |
| 9,930,155 B2 | 3/2018 | Gaw | |
| 10,025,300 B2 | 7/2018 | Michalscheck et al. | |
| 10,706,703 B1* | 7/2020 | Barr | G08B 13/22 |
| 2006/0169033 A1* | 8/2006 | Discenzo | G01N 11/00 |
| | | | 73/64.56 |
| 2009/0308494 A1* | 12/2009 | Linn | B65B 1/04 |
| | | | 141/391 |
| 2017/0108844 A1 | 4/2017 | Drouot et al. | |
| 2017/0208426 A1 | 7/2017 | Komoni et al. | |
| 2017/0239524 A1 | 8/2017 | Lee et al. | |

(Continued)

FOREIGN PATENT DOCUMENTS

WO     2017192429 A1    11/2017

OTHER PUBLICATIONS

Kumar, P.D., et al., Machine Learning Algorithms for Wireless Sensor Networks: A Survey, Information Fusion, 49:1-25, Sep. 2019, 7 pages.

*Primary Examiner* — Tarun Sinha
*Assistant Examiner* — Lal C Mang
(74) *Attorney, Agent, or Firm* — IPTechLaw

(57) ABSTRACT

Implementations of systems for monitoring industrial equipment may include: a processor coupled with one or more sensors. The systems may include one or more input/outputs coupled with the sensors. The one or more input/outputs may be configured to couple with one or more peripheral devices. The processor may be configured to electrically couple with a remote server. The remote server may be configured to process data received from the one or more sensors and instruct, through the processor, the one or more peripheral devices to make an adjustment.

16 Claims, 8 Drawing Sheets

(56) References Cited

U.S. PATENT DOCUMENTS

| | | |
|---|---|---|
| 2017/0248475 A1 | 8/2017 | Bonifas et al. |
| 2017/0302218 A1* | 10/2017 | Janik ................. H02S 10/10 |
| 2017/0351226 A1 | 12/2017 | Bliss et al. |
| 2018/0146042 A1 | 5/2018 | Choi |
| 2018/0255384 A1* | 9/2018 | Phillips ................. H04Q 9/10 |
| 2019/0026618 A1 | 1/2019 | Jesme et al. |
| 2019/0383783 A1* | 12/2019 | Azpiroz ............. G01N 33/18 |
| 2020/0043308 A1* | 2/2020 | Zhang ................. G08B 13/06 |

\* cited by examiner

WIRELESS SENSOR SYSTEM AND RELATED METHODS

CROSS REFERENCE TO RELATED APPLICATIONS

This document claims the benefit of the filing date of U.S. Provisional Patent Application 62/814,189, entitled "Wireless Sensor System and Related Methods" to Brian Downing, et al. which was filed on Mar. 5, 2019, the disclosure of which is hereby incorporated entirely herein by reference.

BACKGROUND

1. Technical Field

Aspects of this document relate generally to wireless devices, such as sensors for monitoring industrial equipment. More specific implementations involve devices capable of being coupled with sensors of industrial equipment to monitor and transmit data.

2. Background

Conventionally, to monitor industrial equipment a technician would be required to visually inspect the sensors on site to collect data. Industrial equipment generally includes a variety of sensors such as temperature, pressure, flow, energy, vibration, etc. to monitor the equipment while it is operating. Readings from these sensors must be collected directly from the equipment causing a gap in time between possible problems with the equipment and information being received and analyzed by a technician.

SUMMARY

Implementations of systems for monitoring industrial equipment may include: a processor coupled with one or more sensors. The systems may include one or more input/outputs coupled with the sensors. The one or more input/outputs may be configured to couple with one or more peripheral devices. The processor may be configured to electrically couple with a remote server. The remote server may be configured to process data received from the one or more sensors and instruct, through the processor, the one or more peripheral devices to make an adjustment.

Implementations of systems for monitoring industrial equipment may include one, all, or any of the following:

The processor may be a core processor.

The one or more sensors may be directly coupled with the one or more peripheral devices.

The remote server may process the data received from the one or more sensors, through the processor, using a machine learning algorithm.

The system may further include a case around the system. The case may include a first portion and second portion. The first portion and the second portion may be removably coupled through a magnetic locking mechanism, a friction fit, or a locking pin mechanism.

The system may further include a LiFePO4 (lithium iron phosphate) battery or a LiPo (lithium polymer) battery.

The system may further include a power charging mechanism. The power charging mechanism may include solar power, wind power, an external battery, or a 120 V power source.

Implementations of devices for monitoring industrial equipment may include: a case having a first portion and a second portion. The case may enclose a processor; a battery; and a plug-in block having one or more input/output ports. The first portion and the second portion of the case may slidably couple in a locked position.

Implementations of devices for monitoring industrial equipment may include one, all, or any of the following:

The device may further include a magnetic locking mechanism having a magnetic latch and magnetic key.

The device may further include a microUSB port.

The processor may be configured to electrically couple with a remote server.

The battery may include a LiFePO4 (lithium iron phosphate) or a LiPo (lithium polymer) battery.

The device may further include a power charging mechanism coupled with the battery.

The power charging mechanism may include solar power, wind power, an external battery, or a 120 V power source.

The device may further include a tamper detection structure in the case.

The processor may be a core processor.

Implementations of methods for monitoring industrial equipment may include: providing a device. The device may include a processor coupled with one or more sensors. The device may also include one or more input/output ports coupled with the one or more sensors. The one or more input/outputs may be configured to couple with one or more peripheral devices. The device may be configured to electrically coupled with a remote server through the processor. The method may include coupling one or more peripheral devices with the one or more input/output ports. The method may include receiving, through the processor, data from the one or more peripheral devices. The method may include sending, using the processor, the data from the one or more peripheral devices to the remote server. The method may include analyzing, using a machine learning algorithm in the remote server, the data from the one or more peripheral devices. The method may include receiving, using the processor, the data from the remote server. The method may further include changing or maintaining, using the processor, a parameter of the one or more peripheral devices using the remote server.

Implementations of methods for monitoring industrial equipment may include one, all, or any of the following:

The device may directly change a parameter of the one or more peripheral devices using the processor.

The parameter may include one of frequency, flow, pressure, gas, level, temperature, vibration, or energy.

The method may further include storing the data, in the processor, from the one or more peripheral devices.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended wireless system for monitoring industrial equipment will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such wireless system for monitoring industrial equipment, and implementing components and methods, consistent with the intended operation and methods.

Figure 1:
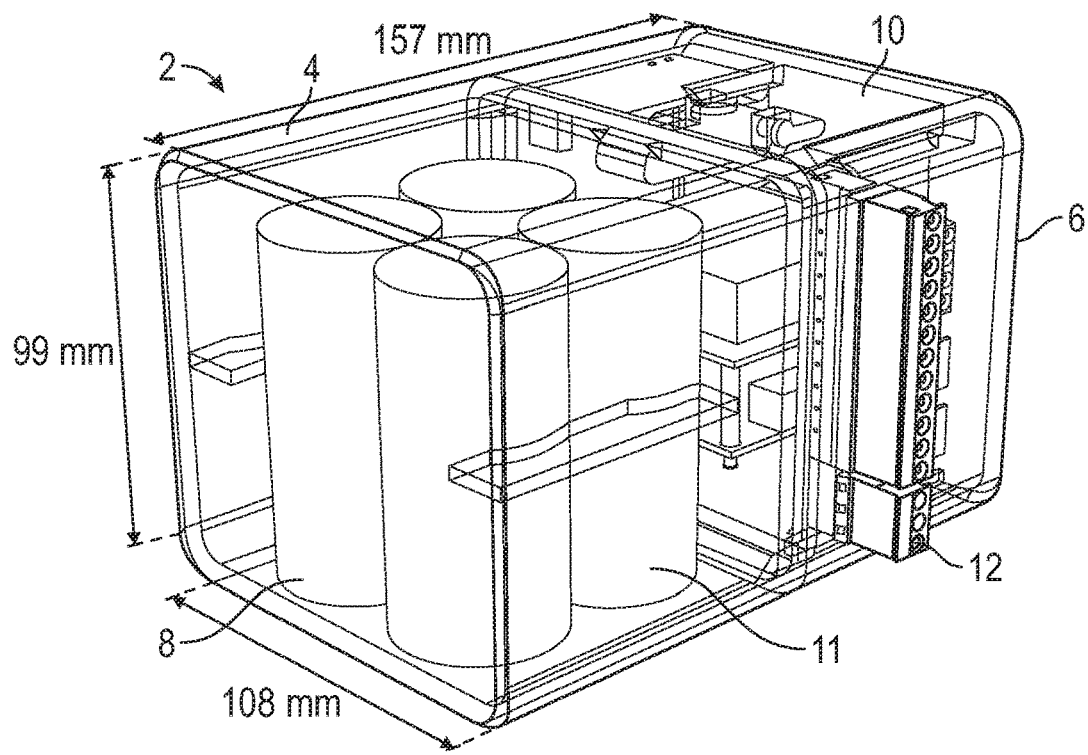
FIG. 1 is a side perspective see-through view of an implementation of a device for monitoring industrial equipment.

Referring to FIG. 1, an implementation of a device 2 for monitoring industrial equipment is illustrated. The dimensions of this particular implementation are a height of 99 mm, a width of 157 mm, and a depth of 108 mm. In other implementations, the device 2 may be smaller or larger though the device has a size capable of being handheld. The device includes a case 4 having a first portion 6 and a second portion 8. The first portion 6 and the second portion 8 slidably couple with each other to enclose the various components. The first portion 6 and the second portion 8 of the case 4 may lock using a friction fit lock, a magnetic lock, a locking pin mechanism, or any combination thereof. In various implementations, the case may be manufactured using a 3D printer. In other implementations the case may be manufactured using molding and casting techniques. The case may be made of materials suited to withstand extreme conditions such as, by non-limiting example, polymers, thermoplastics, and polyurethanes.

In this particular view, the case 4 is see-through to allow visibility of the various components for illustrative purposes. Enclosed in the case is a processor 10 and a battery pack 11. In various implementations, depending on the power storage requirements, the batteries may be either $LiFePO_4$ (lithium iron phosphate) or LiPo (lithium polymer), providing 6 Amp-hours or 2.5 Amp-hours of storage, respectively. A plug-in block 12 including multiple input/output (I/O) ports is included in a wall of the case 4. In this particular implementation, the plug-in block 12 is located in the first portion 6 of the case and is electrically and mechanically coupled with the processor 10. The plug-in block 12 is configured to receive connection from peripheral devices. As used herein peripheral devices include sensors of industrial equipment such as flow sensors, pressure sensors, gas sensors, level sensors, temperature sensors, vibration sensors, energy sensors, and other environmental sensors used on industrial equipment. By non-limiting example, industrial equipment may include water distribution systems, chlorination systems, chlorine residual analyzers, water quality analyzers, and other equipment used to monitor, maintain and analyze large scale systems.

Figure 2:
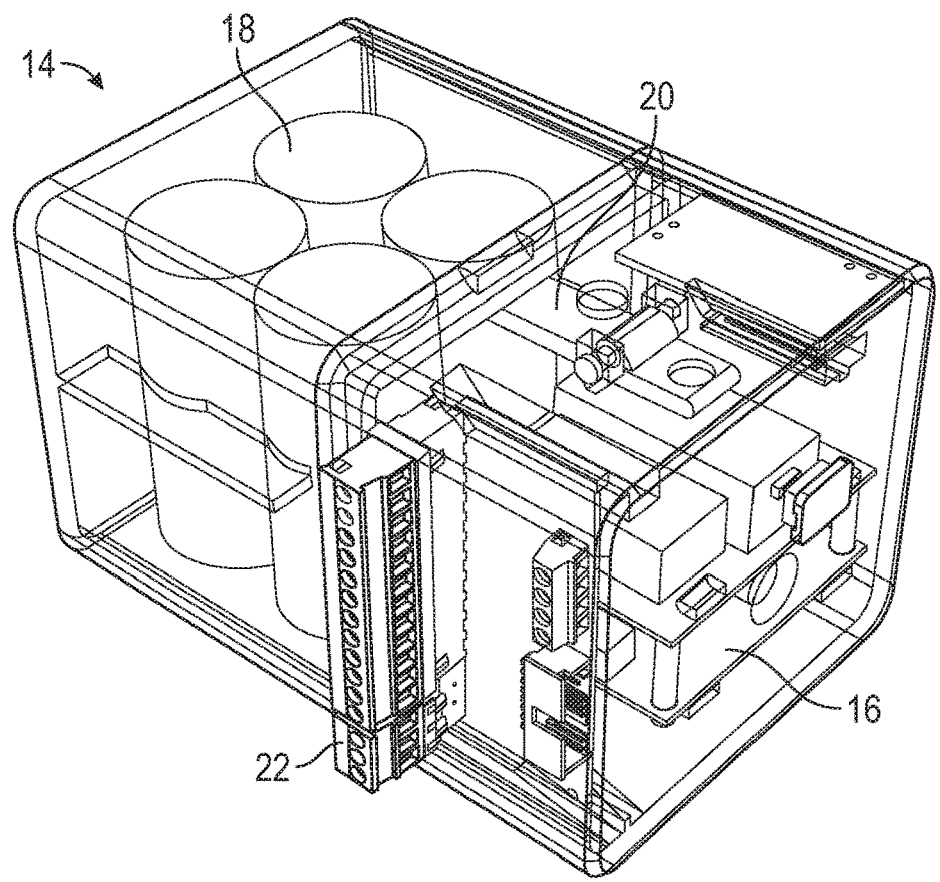
FIG. 2 is a top perspective see-through view of an implementation of a device for monitoring industrial equipment.

Referring to FIG. 2, another view of an implementation of the device 14 for monitoring industrial equipment is illustrated. In this view the various components of the processor are visible including the processor 16, the batteries 18, the magnetic locking mechanism 20, and the plug-in block 22. The magnetic locking mechanism may keep the device secure in the case even when dropped from a height of 300 ft. In this particular implementation, the processor 16 includes a printed circuit board with surface mount components. The particular components include a LTE CAT M1/NB1 module with global hardware support cellular modem chip and Nordic Semiconductor nRF52840 SoC by Nordic Semiconductor headquartered in Trondheim, Norway. The processor further includes an ARM Cortex-M4F 32-bit processor @ 64 MHz processor, 1 MB flash, 256 KB RAM, IEEE 802.15.4-2006: 250 Kbps, Bluetooth 5: 2 Mbps, 1 Mbps, 500 Kbps, 125 Kbps. The processor is able to support Digital signal processing (DSP) instructions, HW accelerated Floating Point Unit (FPU) calculations. The processor further includes ARM TrustZone Crypt® Cell-310 Cryptographic and security module. The processor is able to process up to +8 dBm TX power (down to −20 dBm in 4 dB steps). The processor also includes a NFC-A (near field communication) tag and on-board additional 2 MB SPI flash. The processor further includes 20 mixed signal general-purpose input/output (GPIO) (6× Analog, 8×PWM), a universal asynchronous receiver-transmitter (UART), an inter-integrated circuit (I2C), and a Serial Peripheral Interface (SPI). The processor is FCC and PTCRB certified and is RoHS compliant (lead-free). In various implementations the device may also include an I2C communication port, access to a microUSB port for programming, and resettable polyfuses for overcurrent protection.

Figure 3:
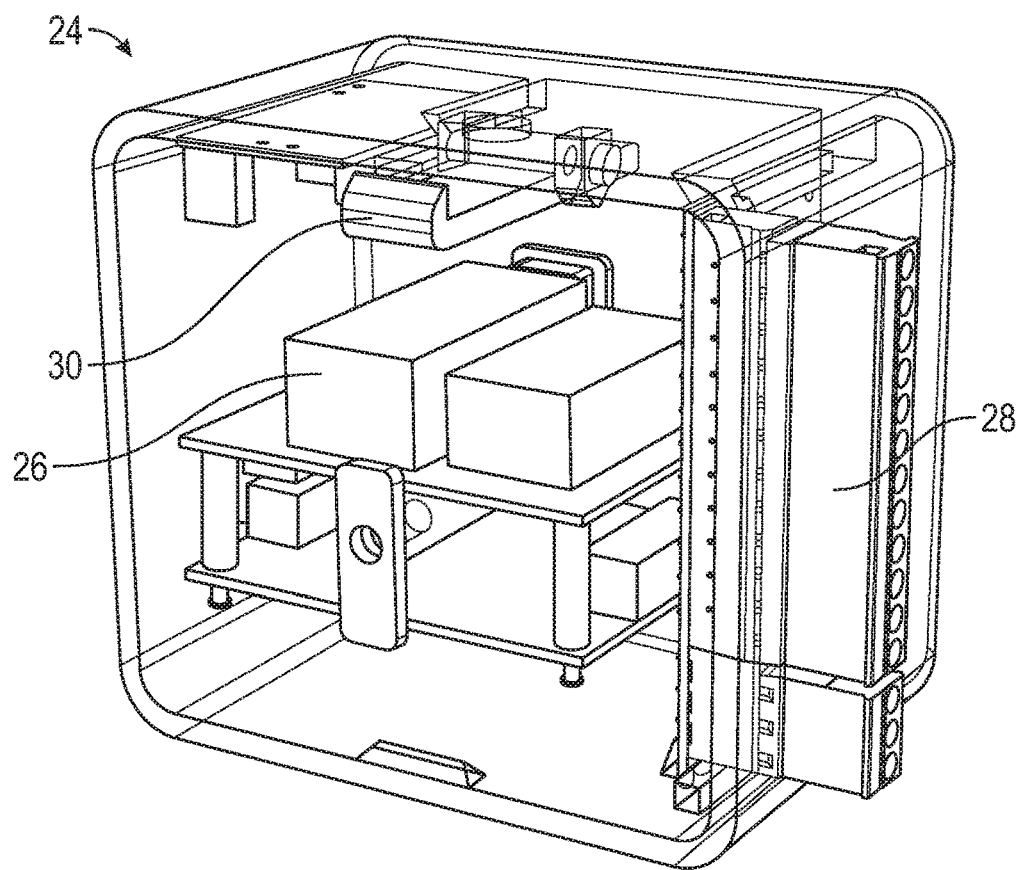
FIG. 3 is an inside view of a first portion of an implementation of a device for monitoring industrial equipment.
Figure 4:
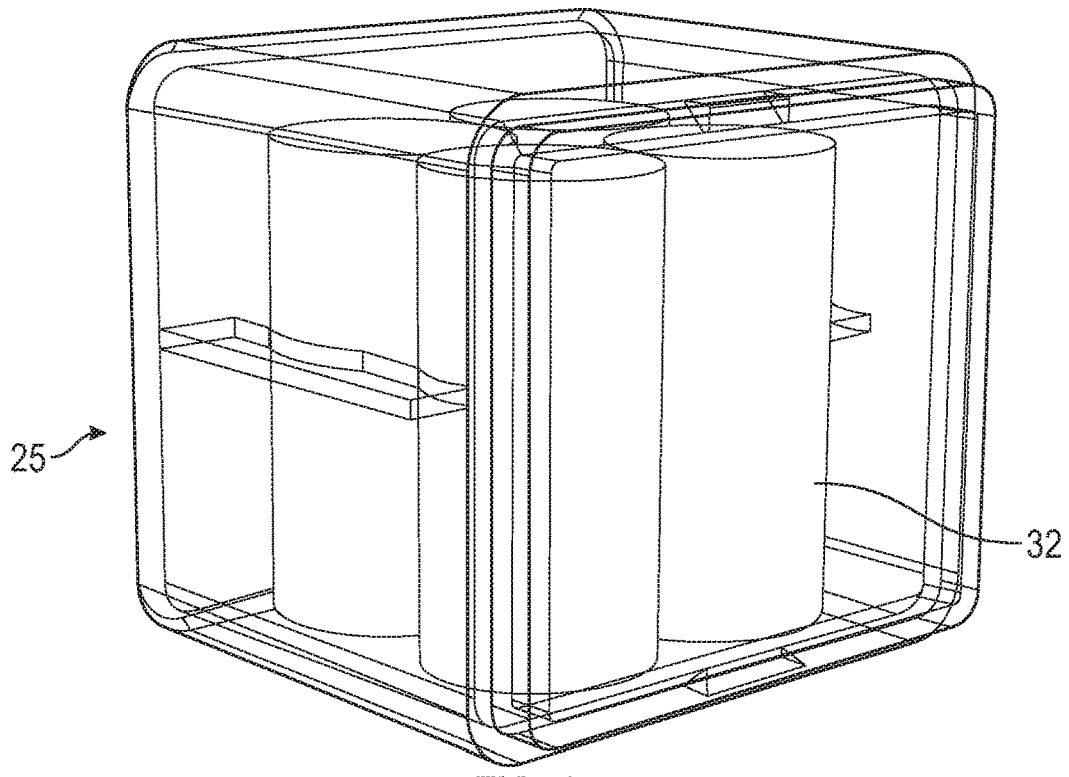
FIG. 4 is an inside view of a second portion of an implementation of a device for monitoring industrial equipment.

Referring to FIGS. 3 and 4, inside views of an implementation of the device are illustrated. Referring to FIG. 3, a first portion 24 of the case of the device including the processor 26 is illustrated. The plug-in block 28 is also illustrated in a wall of the first portion 24 of the case. An implementation of a secure magnetic latch 30 and magnetic key is illustrated extending from an inside of the first portion 24. Referring to FIG. 4, a battery pack 32 is illustrated encased in the second portion 25. In various implementations, a unique on-board data compression algorithm reduces power consumption and provides a high degree of data security. The device also includes a Hall Effect Transistor to sense closure of the case, and trigger the tamper detection system if the case is opened.

Figure 5:
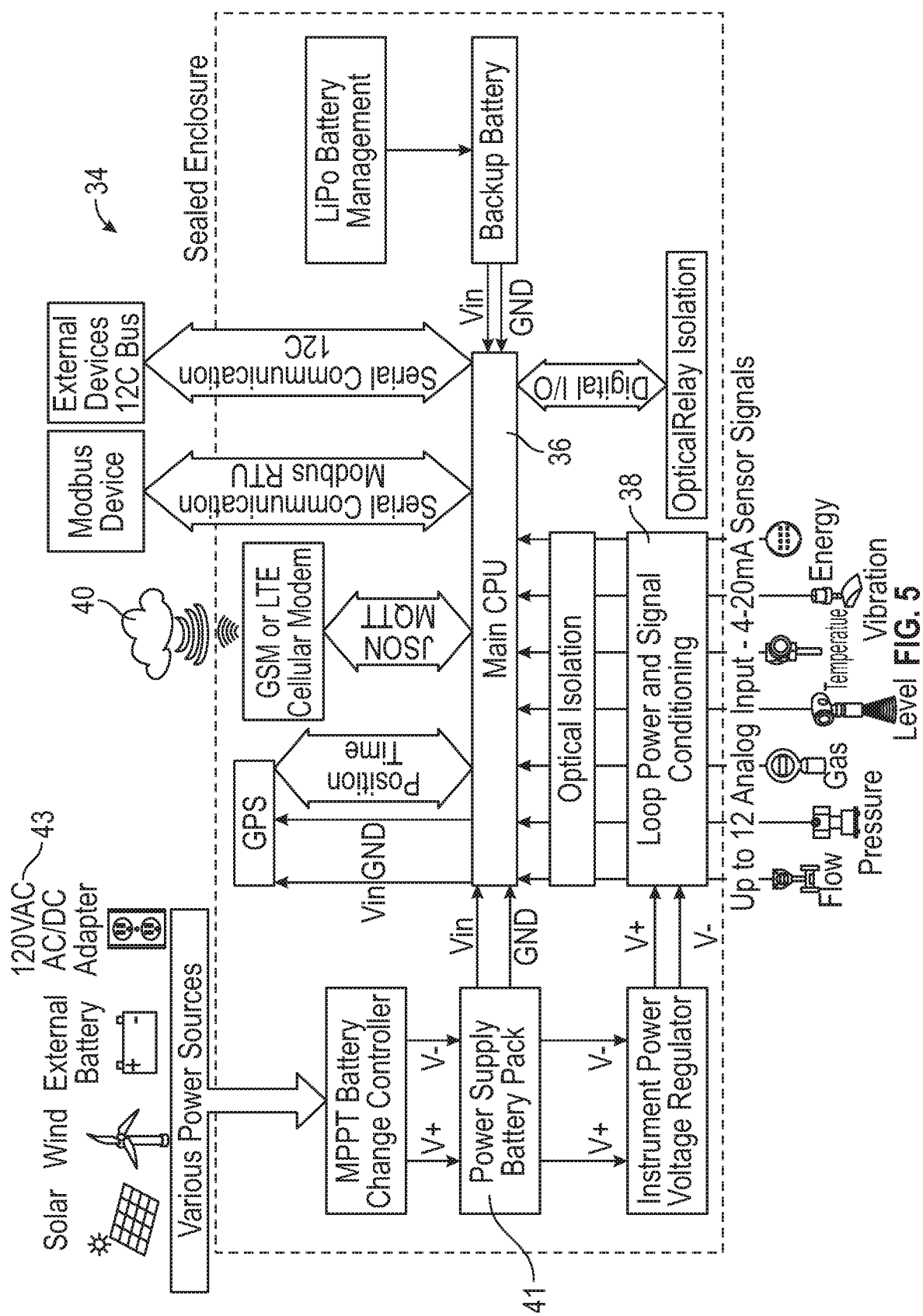
FIG. 5 is a block diagram of the various components of an implementation of a wireless sensor system for monitoring industrial equipment.
Figure 6:
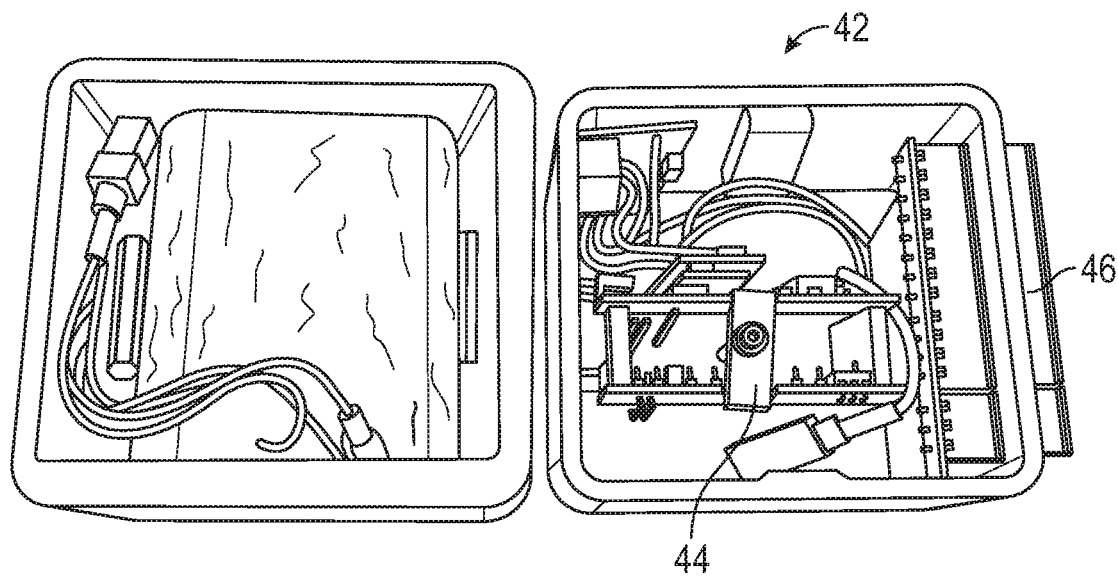
FIG. 6 is an inside view of a first portion and a second portion of an implementation of a device for monitoring industrial equipment.

Referring to FIG. 5, a block diagram of an implementation of a wireless system 34 for monitoring industrial equipment is illustrated. The block diagram 34 is for illustrative purposes. Various implementations of wireless systems may include more or fewer of the components illustrated in FIG. 5. The system includes a processor 36 coupled with multiple sensors 38. In various implementations, the processor may be a core processor. As illustrated in other figures such as, FIGS. 1, 2, 3, 7-9, and 10-12, one or more inputs/output (I/O) ports 12, 22, 28, 46, and 51, respectively, are coupled with the sensors 38 in the system 34. The I/O ports are configured to couple with one or more peripheral devices. As previously described, peripheral devices are defined as flow sensors, pressure sensors, gas sensors, level sensors, temperature sensors, vibration sensors, energy sensors, and other environmental sensors used on industrial equipment. The processor 36 of the wireless system 34 is configured to couple with a remote server 40. The remote server is configured to process data received from the sensors and instruct the one or more peripheral devices, through the processor of the system, to make an adjustment. As illustrated, the sensors 38 may be coupled directly with multiple peripheral devices. The system may also include a power charging mechanism 39. The power charging mechanism 39 may be utilized to charge the batteries 41 when the system is used in a remote location. In various implementations, the power charging mechanism may generate energy through solar power, wind power, an external battery, a 120 V alternating current (AC) battery, or other alternative energy sources 43.

Various implementations of wireless systems as described herein may be used in a method of monitoring and adjusting industrial equipment. The method may include providing a device. The device may include any implementation of a wireless device as illustrated in FIGS. 1-4 and 6-12. Using FIG. 6 as an example, the device 42 may include a processor 44 and one or more I/O ports 46 coupled with one or more sensors. The processor is configured to electrically couple with a remote server. The method includes coupling one or more peripheral devices with the one or more input/output ports 46. The peripheral devices may include various sensors and displays from industrial equipment. The method also includes receiving data, using the processor, from the peripheral devices and sending the data, using the processor, from the peripheral devices to the remote server. The method also includes analyzing, using a machine learning algorithm in the remote server, the data from the peripheral devices. The method further includes receiving the analyzed data, using the processor, from the remote server. The processor may then change or maintain a parameter of the one or more peripheral devices using the analyzed data from the remote server. In testing, an implementation of the wireless device described herein was able to send and receive information from a peripheral device every 10 seconds.

In various implementations of the method of monitoring and adjusting industrial equipment, the processor of the wireless device directly changes a parameter of the one or more peripheral devices based on the data received. In various implementations, the parameters may include frequency, flow, pressure, gas, level, temperature, vibration, or energy. In some implementations, the data from the peripheral devices may be stored in the processor as a data log. The readings or measurements may then be sent by the cellular modem to a server for processing using a wide variety of telecommunication techniques and protocols, including, by non-limiting example, JavaScript object notation (JSON), MQ telemetry transport (MQTT), TCP/IP, secure socket layer (SSL), or any other data transport protocol.

In one particular example, an implementation of a wireless device was used at a water distribution system to monitor the pressure of a City water system. The data received by the processor of the wireless system was logged and sent to the City using the City's NJBSoft (Sampling and Monitoring System) SAMSWater dashboard, where NJBSoft is a software company of Phoenix, Ariz. The pressure data was trended and the values displayed were comparable to other online instruments in use by the City. The unit was in operation for approximately 6 months and performed with no problems. The unit was mounted inside a National Electrical Manufacturers Association (NEMA) 4x Fiberglass Reinforced Polyester (FRP) enclosure, and powered by a 50 W solar panel to keep the internal batteries fully charged.

In another example, an implementation of a wireless device was used at a chlorination system. A chlorine residual analyzer instrument was monitored concurrently. The existing chlorination system used a datalogger device not connected to the City's (Supervisory control and data acquisition) SCADA system. Operators previously drove to the site and downloaded the data from the existing datalogger, and then transferred the data to their computer and water quality management database. Using implementations of the wireless unit described herein, the data was collected continuously and uploaded to the City's SAMS Water database for display and trending. The wireless system as described herein allowed information to be transmitted offsite with no human interaction. This was able to decrease the time between gathering the information and analyzing the data. In this situation, a problem with the chlorination system could be monitored and fixed right away rather than waiting until a technician was able to drive to the chlorination system and realize the problem. In various implementations, the data collected from the wireless system can be sent directly to a technician or it can be stored in a cloud database for further analysis.

In another example, an implementation of a wireless device was installed having an I2C communication port. The device is currently used to collect water quality data from five sensors. The device is able to relay the information in 10 second increments.

Figure 7:
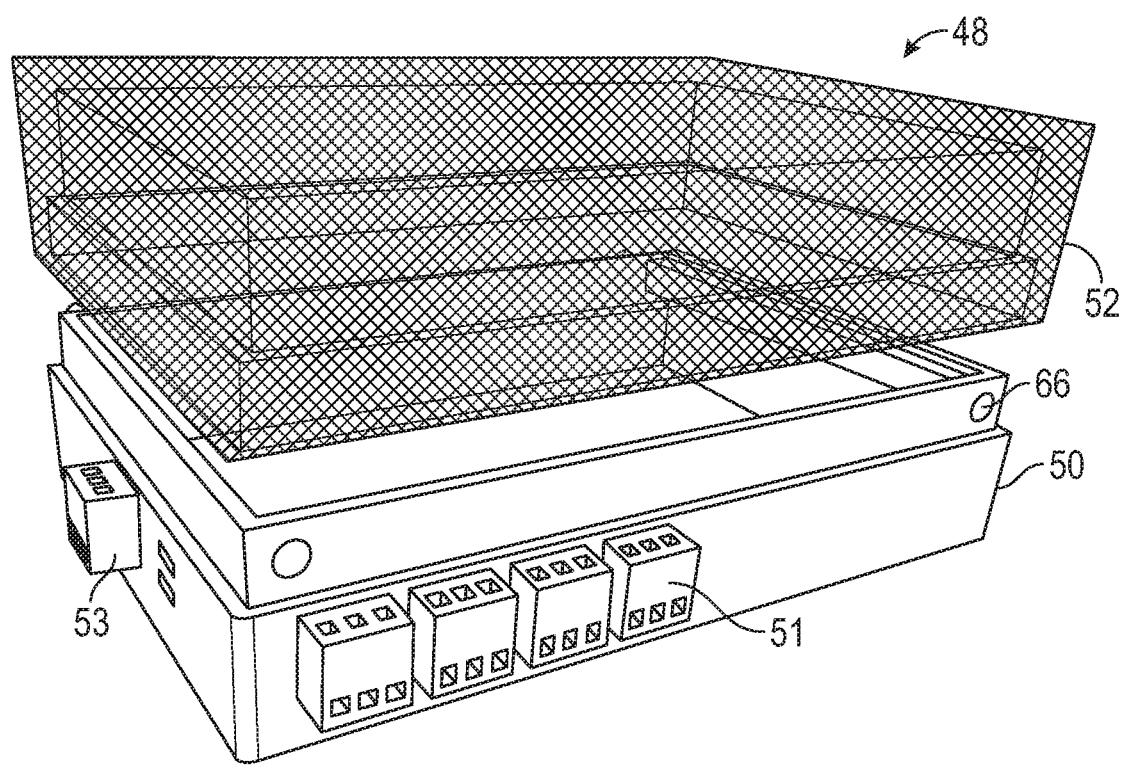
FIG. 7 is a front perspective view of another implementation of a device for monitoring industrial equipment.
Figure 8:
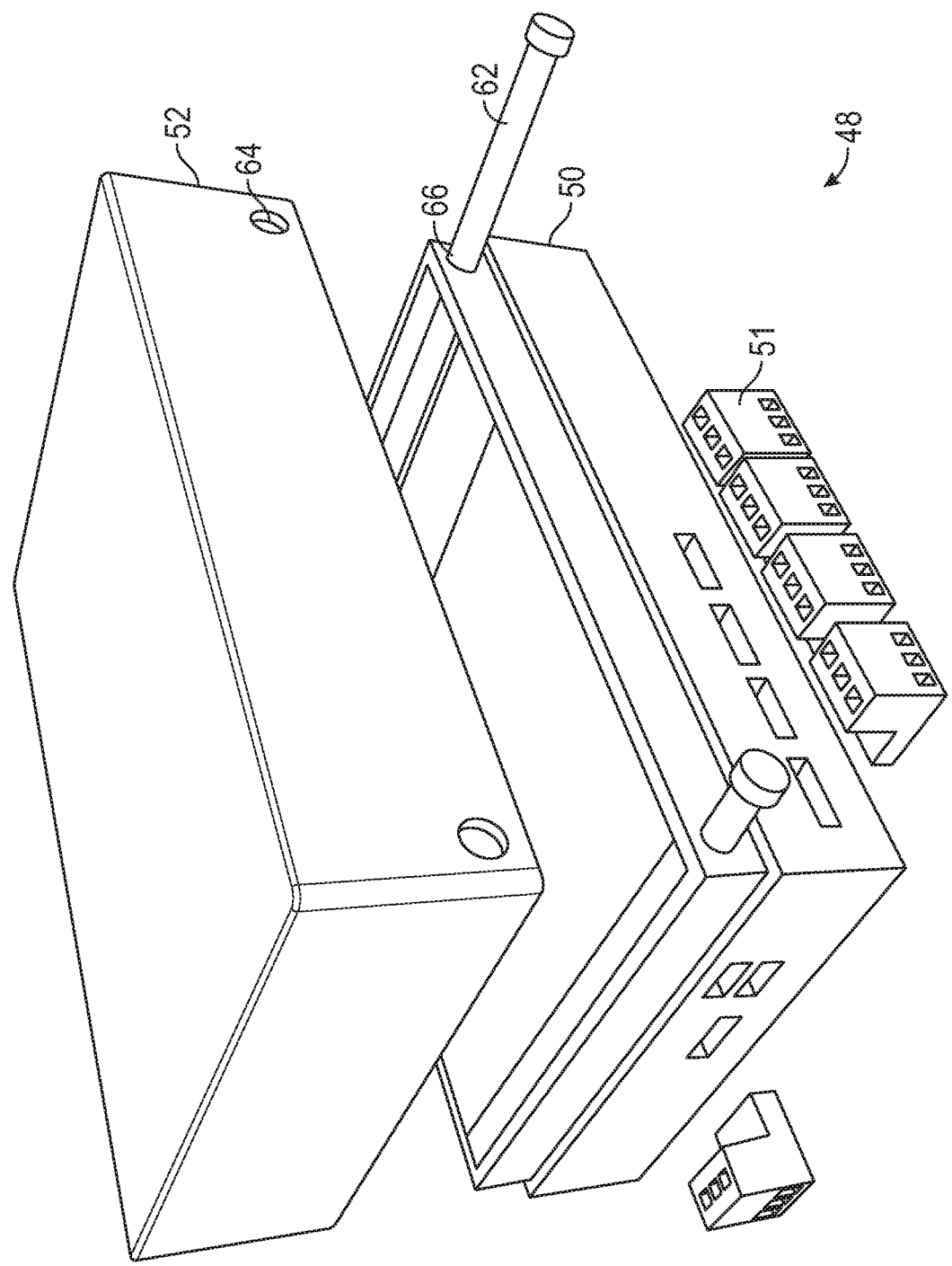
FIG. 8 is a front perspective view of another implementation of a device for monitoring industrial equipment having a pin locking mechanism.
Figure 9:
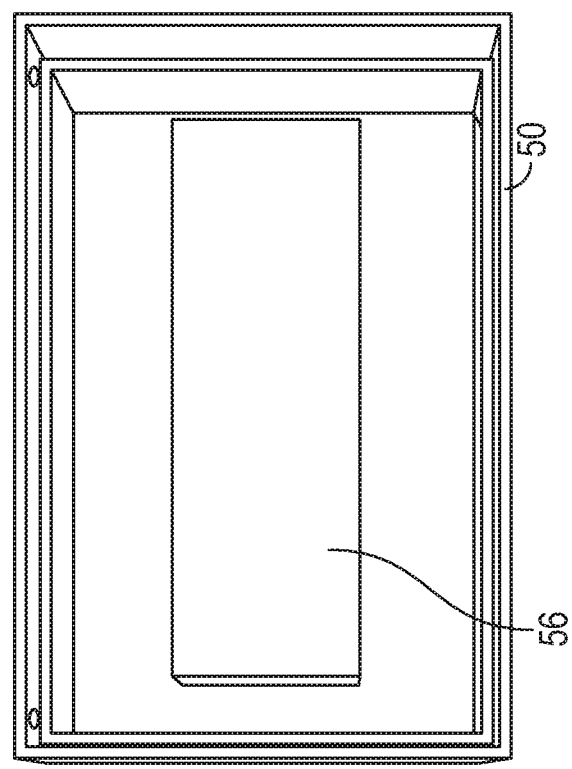
FIG. 9 is a top view of an inside of another implementation of a device for monitoring industrial equipment.
Figure 9:
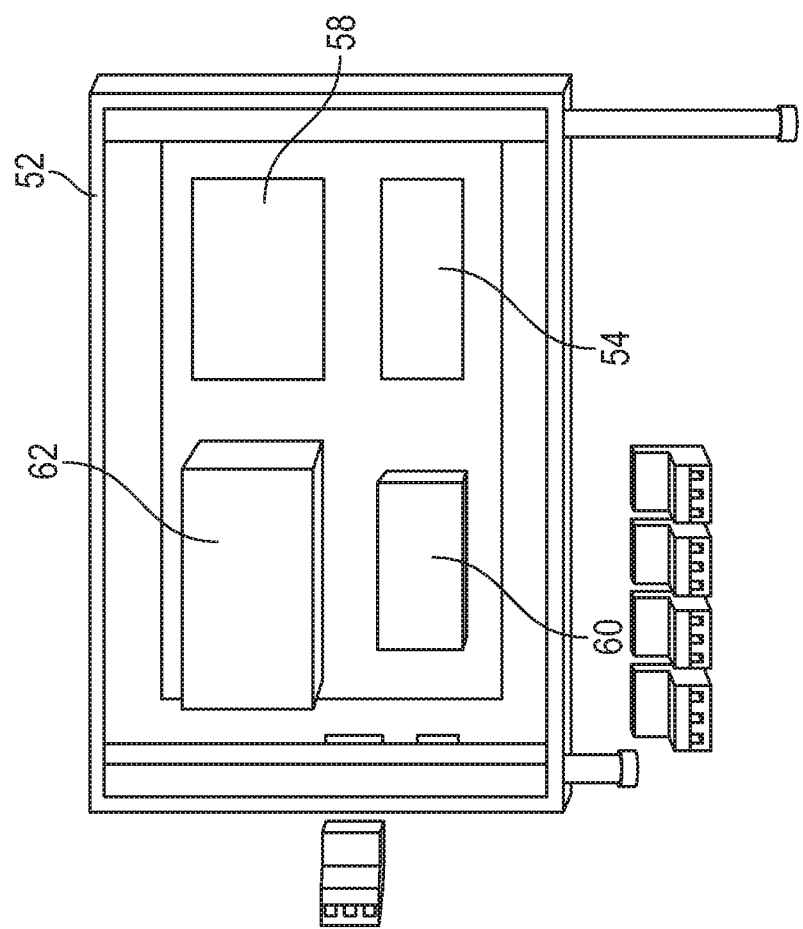

Referring to FIG. 7-12, another implementation of a wireless device is illustrated. Referring to FIG. 7, the device 48 includes a first portion 50 and a second portion 52. As illustrated, the wireless sensor system includes a number of plug-in terminal blocks 51 for connecting input and output (10) sensors and devices. In various implementations, by non-limiting example, the plug-in terminals 51 may be configured to be detachably/exchangeably coupled to the device body, and may be configured to connect to certain sensors, devices, or components, or may be universally configured to connect to any of the aforementioned components. As illustrated, the wireless sensor system also includes one or more plug-in terminal blocks 53 for connecting a power source to the device. As illustrated in FIG. 9, the processor 54 is positioned in the first portion 50 of the case of the device and the battery 56 is positioned in the second portion 52 of the case of the device. In various implementations, the arrangement of the components may be different. In the particular implementation illustrated in FIG. 9, the device also includes a backup battery 58, a DC-DC converter to boost battery voltage to power sensors 60, and a charge controller 62.

Each of the implementations illustrated in FIGS. 7-12 have similar cases but different locking mechanisms. For example referring to FIG. 8, long locking pins 62 are used that extend through openings 64 in the second portion of the case 52 and openings 66 in the first portion 50 of the case. The first portion and the second portion of the case may slidably couple such that the openings 64 in the first portion 50 and openings 66 in the second portion 52 are aligned. The pins 62 may then be inserted to lock the case.

Figure 10:
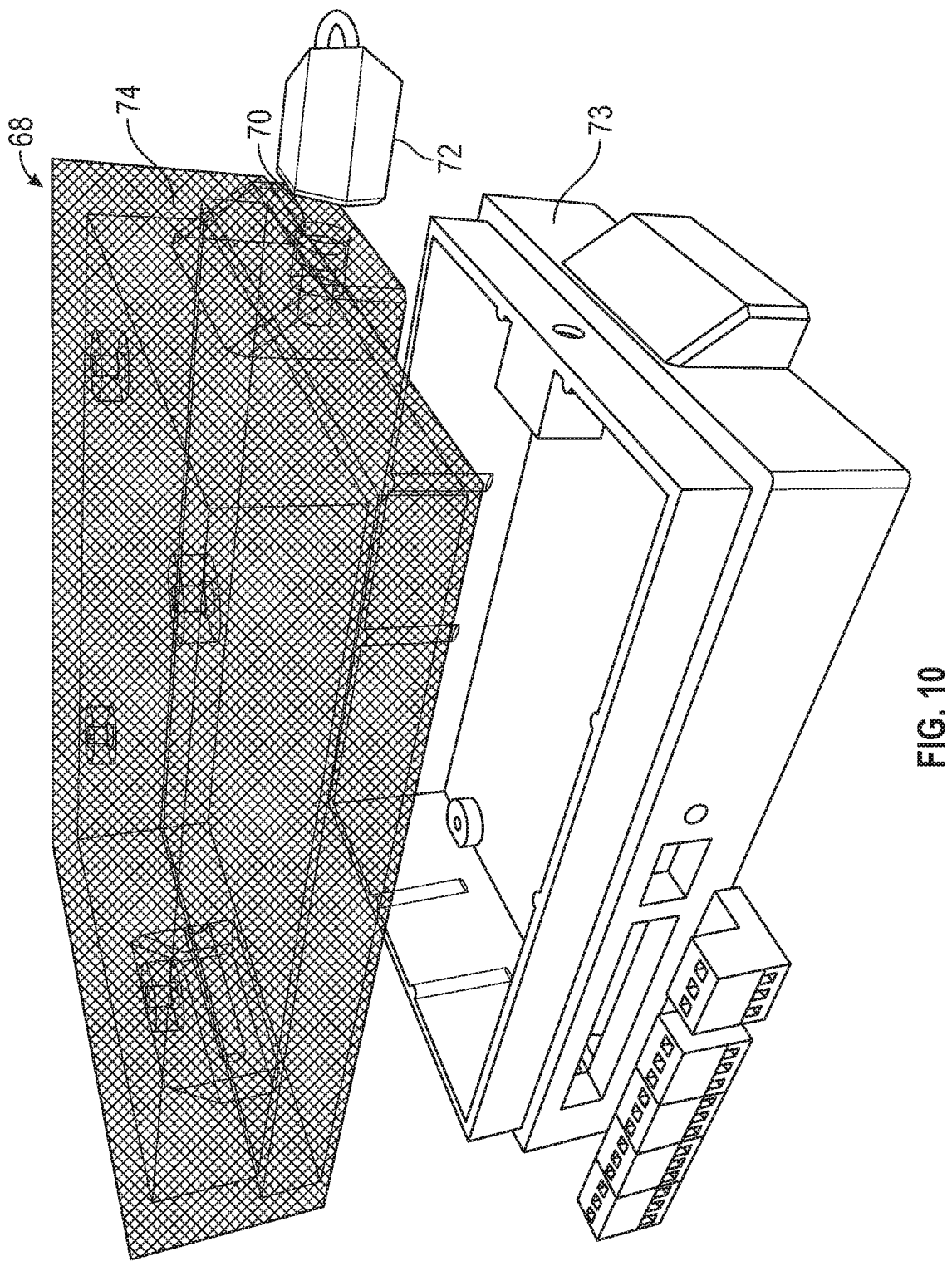
FIG. 10 is a front perspective view of another implementation of a device for monitoring industrial equipment having a magnetic key locking mechanism.
Figure 11:
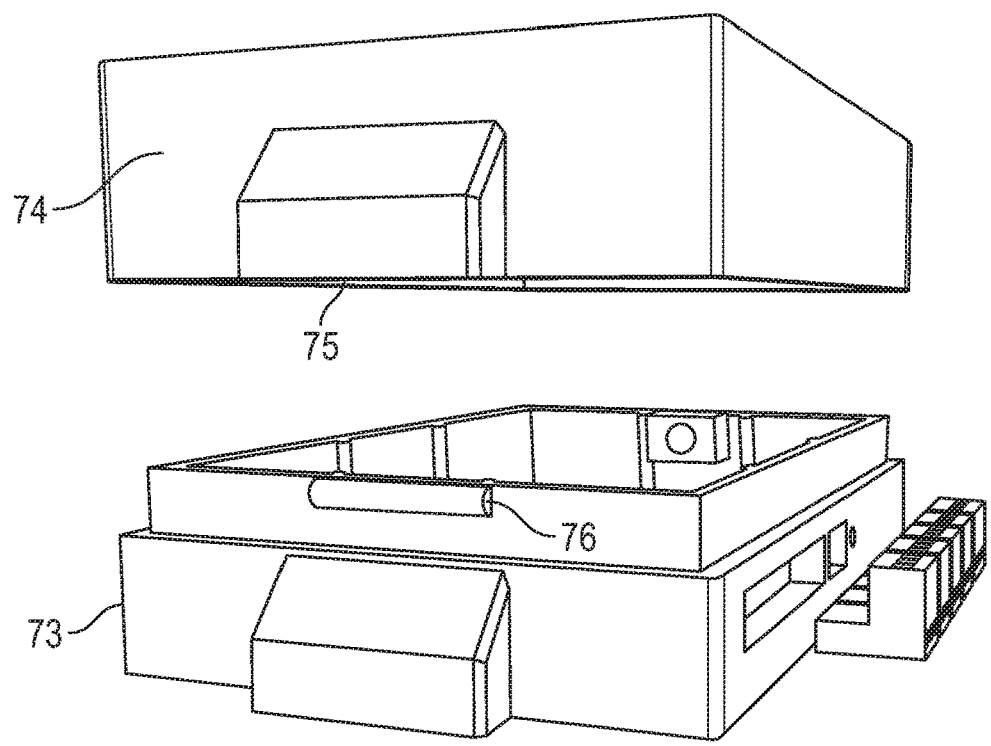
FIG. 11 is a side view of the device from FIG. 10 illustrating a friction fit locking mechanism on a side of the device.
Figure 12:
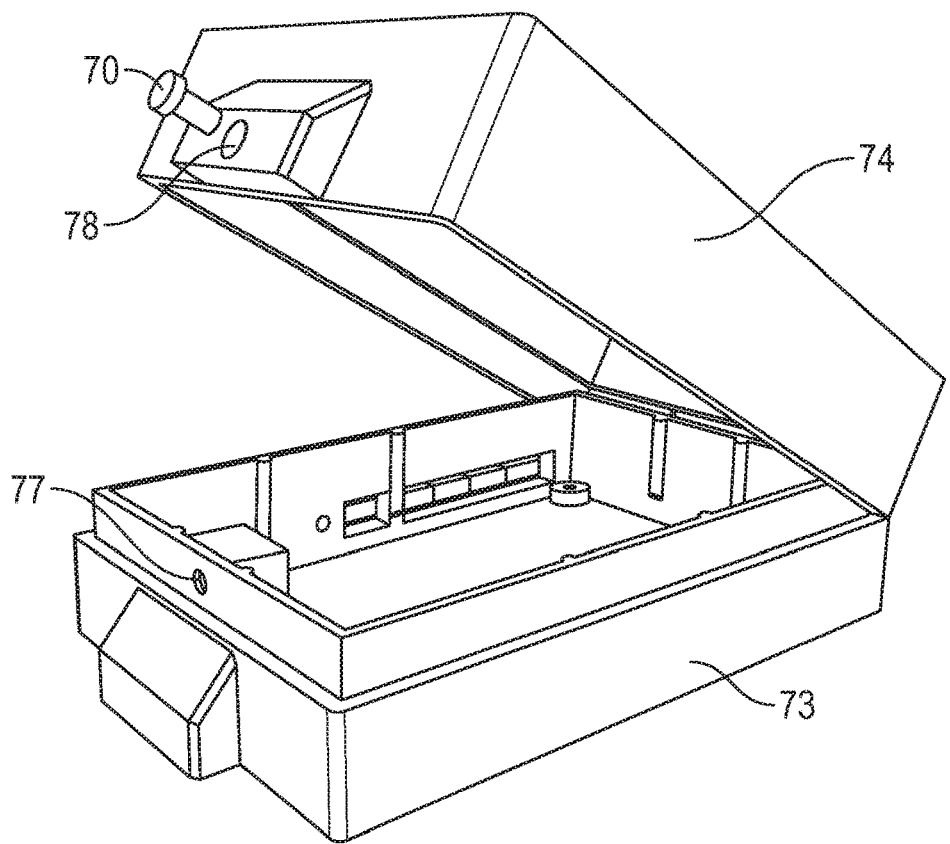
FIG. 12 is a front perspective view of another implementation of a device for monitoring industrial equipment having another implementation of a pin locking mechanism.

Referring to FIG. 10-12, an implementation of the device 68 having a magnetic pin 70 and key 72 locking mechanism is illustrated. The first portion 73 of the case and the second portion 74 may be coupled with a bolt magnet 70. In various implementations, the bolt magnet may be cylindrical in shape, and may be configured to be received by a cylindrical receiver 77 in the first portion 73 that corresponds with a cavity or opening 78 in the second portion 74, which may also be of cylindrical shape. In various implementations, the bolt magnet may be configured to be disposed within the cylindrical receiver and the cavity within the second portion, so as to couple the second portion 74 to the first portion 73. As illustrated, a magnet key 72 may be configured to magnetically couple to the bolt magnet 70 to move the bolt magnet 70 to magnetically lock and unlock the case created by the first portion 73 and the second portion 74.

Referring to FIG. 11, the second portion 74 of the case may include a concave semi-cylindrical void or opening 75 configured to slidably couple with a corresponding convex semi-cylindrical protrusion 76 of the first portion 73 when the wireless sensor system case/enclosure is in a locked position.

In places where the description above refers to particular implementations of wireless sensor systems and implementing components, sub-components, methods and sub-methods, it should be readily apparent that a number of modifications may be made without departing from the spirit thereof and that these implementations, implementing components, sub-components, methods and sub-methods may be applied to other wireless sensor systems.

What is claimed is:

1. A wireless system for monitoring industrial equipment, comprising:
    a first portion of a case comprising:
        a processor coupled with one or more sensors;
        one or more input/outputs coupled with the sensors, the one or more input/outputs configured to couple with one or more peripheral devices; and
        a magnetic latch rotatably coupled to an interior of the first portion, the magnetic latch comprising a hook at an end of the magnetic latch; and
    a second portion of a case comprising:
        a battery; and
        a notch in an edge of the second portion of the case, the notch configured to engage with the hook;
    wherein the processor is configured to electrically couple with a remote server, the remote server configured to process data received from the one or more sensors and instruct the one or more peripheral devices to make an adjustment.

2. The system of claim 1, wherein the processor is a core processor.

3. The system of claim 1, wherein the one or more sensors are directly coupled with the one or more peripheral devices.

4. The system of claim 1, wherein the remote server processes the data received from the one or more sensors using a machine learning algorithm.

5. The system of claim 1, wherein the first portion and the second portion are removably coupled with one another.

6. The system of claim 1, further comprising one of a LiFePO4 (lithium iron phosphate) battery or LiPo (lithium polymer) battery.

7. The system of claim 1, further comprising a power charging mechanism, wherein the power charging mechanism comprises one of solar power, wind power, an external battery, or a 120 V power source.

8. A device for monitoring industrial equipment, the device comprising:
    a case comprising a first portion and a second portion;
        the first portion of the case enclosing:
            a processor;
            a magnetic latch rotatably coupled to the first portion and comprising a hooked end; and
            a plug-in block comprising one or more input/output ports; and
        the second portion of the case enclosing:
            a battery; and
            a notch along an edge of the second portion configured to receive the hooked end of the magnetic latch;
    wherein the first portion and the second portion slidably couple into a locked position through the magnetic latch.

9. The device of claim 8, further wherein the magnetic latch rotatably transitions the hooked in into and out of the notch in response to movement of a magnetic key above the first portion of the case.

10. The device of claim 8, further comprising a microUSB port.

11. The device of claim 8, wherein the processor is configured to electrically couple with a remote server.

12. The device of claim 8, wherein the battery comprises one of a LiFePO4 (lithium iron phosphate) or LiPo (lithium polymer) battery.

13. The device of claim 8, further comprising a power charging mechanism coupled with the battery.

14. The device of claim 13, wherein the power charging mechanism comprises one of solar power, wind power, an external battery, or a 120 V power source.

15. The device of claim 8, further comprising a tamper detection structure in the case comprising a Hall effect transistor.

16. The device of claim 8, wherein the processor is a core processor.

* * * * *